(12) United States Patent
Park (10) Patent No.: US 11,247,281 B2
(45) Date of Patent: Feb. 15, 2022

(54) ANCHOR BOLT MACHINING APPARATUS

(71) Applicant: LG CHEM, LTD., Seoul (KR)

(72) Inventor: Jong Hyuk Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/756,425

(22) PCT Filed: Jul. 15, 2019

(86) PCT No.: PCT/KR2019/008694
§ 371 (c)(1),
(2) Date: Apr. 15, 2020

(87) PCT Pub. No.: WO2020/040427
PCT Pub. Date: Feb. 27, 2020

(65) Prior Publication Data
US 2020/0331082 A1 Oct. 22, 2020

(30) Foreign Application Priority Data
Aug. 23, 2018 (KR) .................. 10-2018-0098338

(51) Int. Cl.
*B23G 9/00* (2006.01)
*B23P 6/00* (2006.01)

(52) U.S. Cl.
CPC ............... *B23G 9/009* (2013.01); *B23P 6/00* (2013.01)

(58) Field of Classification Search
CPC ............... B23G 9/009; B23G 2210/08; B23G 2240/12; B23G 1/261; B23P 6/00; F16M 7/00; E04C 5/165; E04H 7/02
See application file for complete search history.

(56) References Cited

U.S. PATENT DOCUMENTS

| 5,163,775 | A | * | 11/1992 | Rowan, Jr. | ................ | F16M 7/00 403/301 |
| 5,393,165 | A | * | 2/1995 | Rowan, Jr. | ................ | F16M 7/00 403/301 |
| 5,803,676 | A | | 9/1998 | Wienss | | |
| 2009/0169332 | A1 | * | 7/2009 | Suehiro | .................... | F16M 7/00 411/367 |

FOREIGN PATENT DOCUMENTS

| CN | 202114442 U | 1/2012 |
| CN | 205324910 U | 6/2016 |
| CN | 206614110 U | 11/2017 |
| CN | 108188505 A | 6/2018 |
| CN | 108222088 A | 6/2018 |
| JP | 1997-155639 A | 6/1997 |
| JP | 200084745 A | 3/2000 |

(Continued)

*Primary Examiner* — Sarang Afzali
*Assistant Examiner* — Darrell C Ford
(74) *Attorney, Agent, or Firm* — Dentons US LLP (57) ABSTRACT

An anchor bolt machining apparatus including an anchor bolt machining die and a die holder. The anchor bolt machining die includes a first head portion for fixing an anchor bolt and a first body portion receiving a screw machining die and the die holder includes a second head portion coupled to a rotational force supply device, a support portion coupled to the anchor bolt machining die, and a second body portion connecting the second head portion and the support portion.

13 Claims, 7 Drawing Sheets

(56) References Cited

FOREIGN PATENT DOCUMENTS

| | | |
|---|---|---|
| JP | 2004183293 A | 7/2004 |
| JP | 2008-246647 A | 10/2008 |
| JP | 2014-190841 A | 10/2014 |
| JP | 2015202540 A | 11/2015 |
| JP | 2016-212053 A | 12/2016 |
| KR | 1997-0010007 A | 3/1997 |
| KR | 200439357 Y1 | 4/2008 |
| KR | 20-2009-0000641 U | 1/2009 |
| KR | 10-0942225 B1 | 2/2010 |
| KR | 10-1550430 B1 | 9/2015 |
| KR | 10-2016-0017322 A | 2/2016 |
| KR | 10-1615016 B1 | 4/2016 |
| KR | 2017-0011064 A | 2/2017 |
| KR | 10-2017-0069565 A | 6/2017 |
| WO | 9734725 A1 | 9/1997 |
| WO | 2015/044627 A1 | 4/2015 |

\* cited by examiner

ANCHOR BOLT MACHINING APPARATUS

CROSS-REFERENCE TO RELATED APPLICATIONS

This application is a U.S. nation stage of international Application No. PCT/KR2019/008694, filed Jul. 15, 2019, and claims priority to Korean Patent Application No. 10-2018-0098338, filed Aug. 23, 2018, the entire contents of which is incorporated herein for all purposes by this reference.

TECHNICAL FIELD

The present invention relates to an anchor bolt machining apparatus, and more particularly, to an anchor bolt machining apparatus for repairing a corroded anchor bolt which is generally used for fixing various types of field tanks installed in an outdoor space.

BACKGROUND

Figure 6:
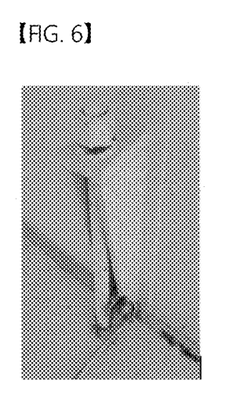
FIG. 6 is a photograph of an anchor bolt that is installed for fixing a tank.

In general, a storage tank for storing raw materials or the like, in particular, a field tank installed in an outdoor space, is supported and fixed by an anchor bolt when the tank is installed. Most of a length of the anchor bolt is embedded in the foundation surface (or base surface) such as concrete, a part thereof protrudes from the foundation surface, and the protruding part is connected to the tank, as illustrated in FIG. 6.

Figure 7:
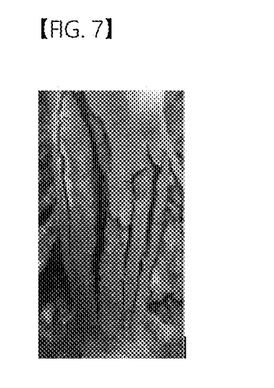
FIGS. 7 and 8 are photographs of the corrosion state of an anchor bolt.
Figure 8:
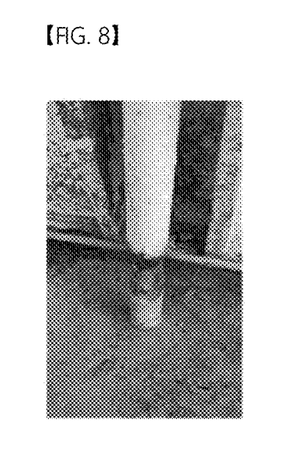
Figure 9:
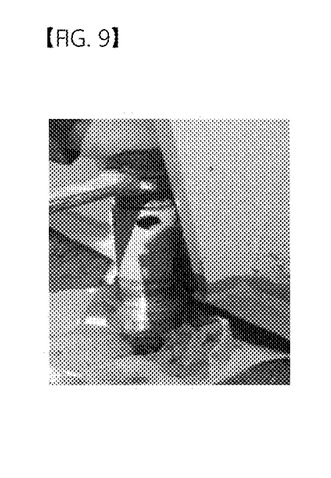
FIG. 9 is a photograph of an anchor bolt machining apparatus according to an exemplary embodiment coupled to a machine.

However, since the anchor bolt is present with a portion protruding from the foundation surface, corrosion occurs due to an external environment during long-term use, and rainwater flows into an interface between the foundation surface where the tank is installed and the anchor bolt to cause deterioration, as illustrated in FIGS. 7 and 8. In order to minimize the progress of corrosion of the anchor bolt, the anchor bolt is repaired using paint, a drain ring, a corrosion inhibitor, etc., but it is difficult to solve the fundamental problem of corrosion.

In addition, in order to repair the corroded anchor bolt, a method of replacing the anchor bolt may also be considered. However, replacement of the entire anchor bolt installed inside the foundation surface may degrade the stability of the facility itself such as the tank or the like, and replacement of the protruding portion of the anchor bolt may cause problems such as a fire, an explosion, or the like, which is anticipated when working with an inflammable work such as welding or the like, and thus, it is difficult to directly replace the anchor bolt.

Meanwhile, as a way to solve the above problems, Japanese Patent Laid-Open Publication No. 2016-212053 discloses a fixing device for fixing a storage device. The storage device, however, does not provide a fundamental solution to repair an already installed anchor bolt itself in that the storage device is fixed to a separate fixing support, rather than the foundation surface directly installed on the outside, such as concrete or the like, and an anchor bolt fixed to the fixing support is replaced.

SUMMARY

An object of the present invention is to repair an anchor bolt which is installed on a foundation surface and repairs due to corrosion, while preventing stability of a facility and a safety problem such as a fire during replacement of the anchor bolt, in order to solve the problems mentioned in the background of the present invention.

That is, the present invention is devised to solve the problems of the background art of the present invention and provides an anchor bolt machining apparatus capable of directly repairing an anchor bolt in a narrow space, while preventing degradation of the stability of a facility and a safety problem such as a fire during replacement of the anchor bolt, when the anchor bolt for fixing a tank is corroded.

In one general aspect, an anchor bolt machining apparatus includes an anchor bolt machining die and a die holder, wherein the anchor bolt machining die includes a first head portion for fixing an anchor bolt and a first body portion receiving a screw machining die and the die holder includes a second head portion coupled to a rotational force supply device, a support portion coupled to the anchor bolt machining die, and a second body portion connecting the second head portion and the support portion.

In the case of using the anchor bolt machining apparatus according to the present invention, when the anchor bolt for fixing and supporting a tank is corroded, the anchor bolt can be directly repaired in a narrow space, while preventing degradation of stability of a facility and a safety problem such as a fire during replacement of the anchor bolt.

DETAILED DESCRIPTION

Terms and words used in the present specification and claims are not to be construed as a general or dictionary meaning but are to be construed as meaning and concepts meeting the technical ideas of the present invention based on a principle that the inventors may appropriately define the concepts of terms in order to describe their own inventions in the best mode.

Hereinafter, an anchor bolt machining apparatus according to an embodiment of the present invention will be described in detail with reference to the accompanying drawings.

Figure 1:
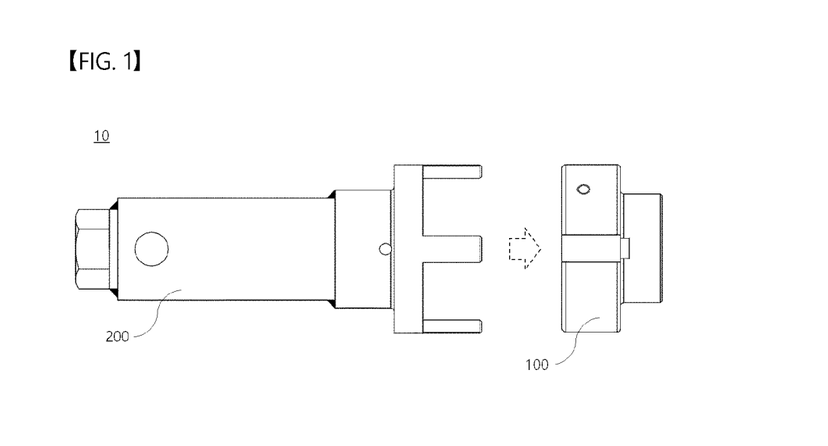
FIG. 1 is a side view of an anchor bolt machining apparatus showing a coupling direction thereof according to an exemplary embodiment.

As shown in FIG. 1, an anchor bolt machining apparatus 10 according to the present invention includes an anchor bolt machining die 100 and a die holder 200.

Figure 2:
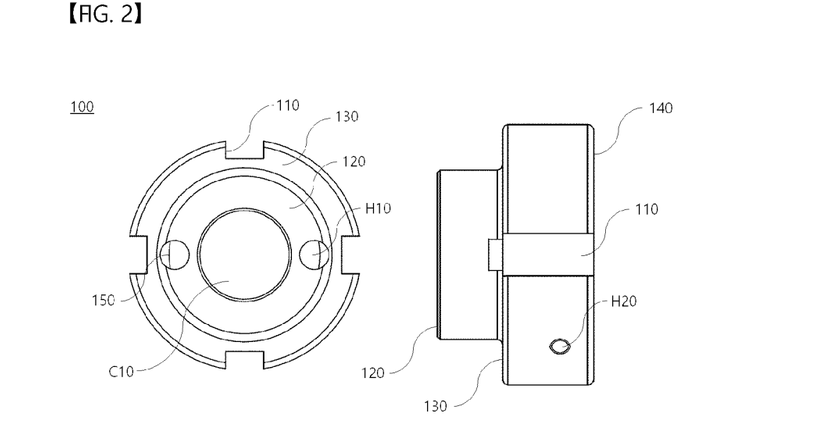
FIGS. 2 and 3 each include a plan view and a side view of an anchor bolting machining die according to an exemplary embodiment.
Figure 3:
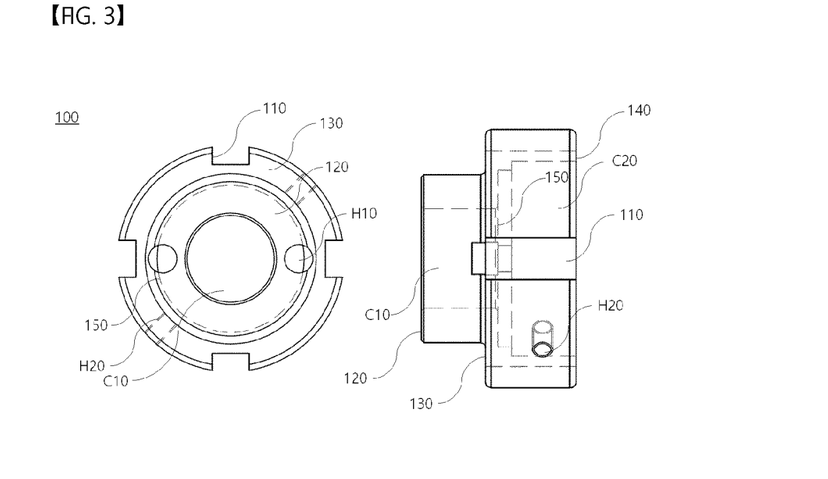

According to an embodiment of the present invention, the anchor bolt machining die 100 may include a first head portion 120 for fixing an anchor bolt and a first body portion 130 for receiving a screw machining die 150 as shown in FIGS. 2 and 3.

Figure 4:
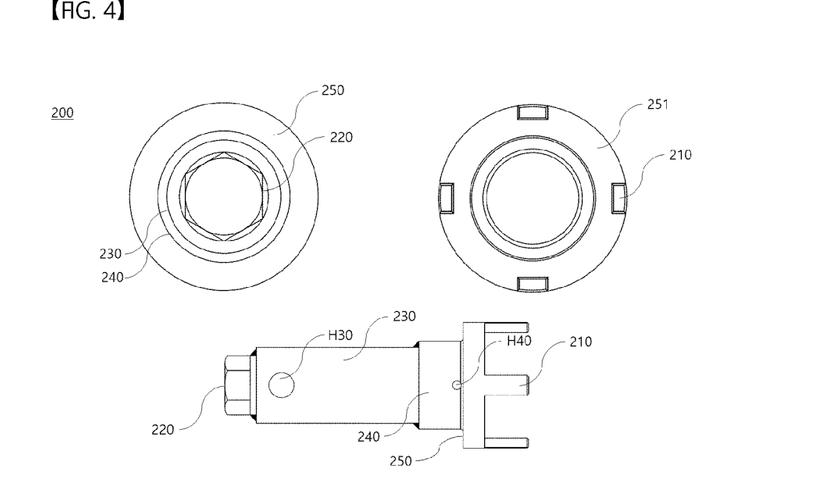
FIGS. 4 and 5 each include a plan view, a rear view, and a side view of a die holder according to an embodiment of the present invention.
Figure 5:
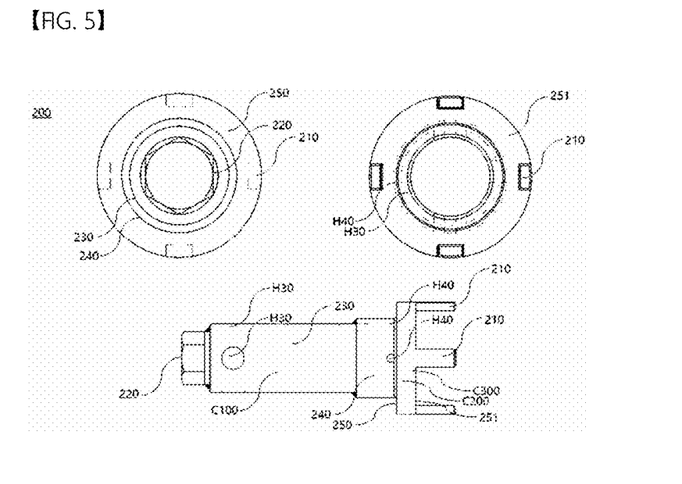

Further, according to an embodiment of the present invention, the die holder 200 may include a second head portion 220 coupled to a rotational force supply device (500), a support portion 250 coupled to the anchor bolt machining die 100, and second body portions 230 and 240 connecting the second head portion 220 and the support portion 250 as shown in FIGS. 4 and 5.

The anchor bolt machining apparatus 10 according to the present invention will be described in more detail with reference to FIGS. 2 to 5.

According to an embodiment of the present invention, the anchor bolt machining apparatus 10 may be coupled by coupling a die holder fixing groove 110 provided on an outer circumferential surface of the first body portion 130 of the anchor bolt machining die 100 and an anchor bolt machining die fixing support 210 protruding in a direction of a lower surface of the support portion 250 of the die holder 200.

According to an embodiment of the present invention, the die holder fixing groove 110 and the anchor bolt machining die fixing support 210 may have a concavo-convex relationship with each other. Specifically, the die holder fixing groove 110 may surround a portion of the anchor bolt machining die fixing support 210. Here, the die holder fixing groove 110 and the anchor bolt machining die fixing support 210 may each have a circular or polygonal shape, and the shape is not particularly limited if the concavo-convex relationship is established with each other.

According to an embodiment of the present invention, as the anchor bolt machining die fixing support 210 is inserted into the die holder fixing groove 110, the anchor bolt machining die 100 and the die holder 200 are coupled to each other, and when a rotational force is supplied to the die holder 200 by the rotational force supply device (500) coupled to the second head portion 220, the rotational force is also supplied to the anchor bolt machining die 100 due to the coupling of the die holder fixing groove 110 and the anchor bolt machining die fixing support 210.

In addition, according to an embodiment of the present invention, the number of the die holder fixing grooves 110 provided on the outer circumferential surface of the first body portion 130 of the anchor bolt machining die 100 and the number of the anchor bolt machining die fixing support 210 protruding in the direction of the lower surface of the support portion 250 of the die holder 200 may be 2 to 8, 2 to 6, or 4. Specifically, four die holder fixing grooves 110 and four anchor bolt machining die fixing supports 210 may be provided in all directions, i.e., in four directions of 0°, 90°, 180° and 270° with respect to the center, respectively.

However, the die holder fixing groove 110 and the anchor bolt machining die fixing support 210 may be provided in the same number as pairs with each other and may be provided at the same position to form the concavo-convex relationship with each other.

According to an embodiment of the present invention, the anchor bolt machining die 100 may serve to machine a thread on the anchor bolt. Specifically, the anchor bolt machining die 100 may serve to machine the anchor bolt using the screw machining die 150 received therein.

According to an embodiment of the present invention, the anchor bolt machining die 100 may include the first head portion 120 for inserting and supporting the anchor bolt and the first body portion 130 receiving the screw machining die 150 for machining the anchor bolt.

As a specific example, the first head portion 120 of the anchor bolt machining die 100 may include a first center hole C10 for the anchor bolt to be inserted. The first center hole C10 may be a hole allowing an end portion of the anchor bolt, from which a corroded portion was cut away for machining the anchor bolt, to be directly inserted into the anchor bolt machining die 100.

In addition, as a specific example, the first body portion 130 of the anchor bolt machining die 100 may include a second center hole C20 for receiving the screw machining die 150. According to another embodiment of the present invention, it is also possible to provide the screw machining die 150 directly in the first body portion 130. Here, in order to diversify types of the screw machining die 150 applicable according to sizes of the anchor bolt, preferably, the separate second center hole C20 is provided in the first body portion 130 and the screw machining die 150 is received therein.

According to an embodiment of the present invention, an inner diameter of the first center hole C10 may be 1 to times, 1 to 1.8 times, or 1 to 1.5 times an outer diameter of the anchor bolt. When the anchor bolt is machined within this range, the anchor bolt may be fully fixed and supported.

In addition, according to an embodiment of the present invention, the inner diameter of the first center hole C10 may be smaller than an inner diameter of the second center hole C20 and may be the same as or smaller than an inner diameter of the screw machining die 150.

According to an embodiment of the present invention, the first head portion 120 may include a drain hole H10. The drain hole H10 may be a hole for discharging lubricant injected to improve workability of the anchor bolt when the anchor bolt is machined. The drain hole H10 may be formed to penetrate in a direction of the second center hole C20 from an upper surface of the first body portion 130.

In addition, according to an embodiment of the present invention, one to five, one to three, or one to two drain holes H10 may be formed as necessary. As described above, when the first body portion 130 includes the drain hole H10, it is possible to discharge dust that occurs due to the machining of the anchor bolt, etc., together with a lubricant, etc., thereby improving workability of the anchor bolt.

In addition, according to an embodiment of the present invention, in the screw machining die 150 received in the second center hole C20, the upper surface of the screw machining die 150 may face an interface between the first center hole C10 and the second center hole C20 located on an inner surface of the first body portion 130, and an outer circumferential surface of the screw machining die 150 may face the inner circumferential surface of the second center hole C20.

In addition, according to an embodiment of the present invention, a portion of the upper surface of the screw machining die 150 may face the drain hole H10. In this case, dust generated when the anchor bolt is machined from the screw machining die 150, a lubricant, or the like used for the machining may be discharged as soon as possible, thereby improving workability of the anchor bolt.

According to an embodiment of the present invention, the screw machining die 150 may be a die for machining a thread at an end portion of a cut surface of the anchor bolt inserted into the anchor bolt machining apparatus 10.

In addition, according to an embodiment of the present invention, the screw machining die 150 may include a M30 to M48 standard thread, a M30 to M36 standard thread, or a M42 to M48 standard thread in millimeters (mm) on an inner surface thereof.

According to an embodiment of the present invention, the first body portion 130 may include a fixing hole H20 penetrating the outer circumferential surface and the inner circumferential surface of the first body portion 130. The fixing hole H20 may be a hole for fixing the screw machining die 150, and the screw machining die 150 may be fixed by inserting a fixing device into the fixing hole H20.

According to the embodiment of the present invention, a lower surface 251 of the support portion 250 of the die holder 200, in particular, the lower surface 251 excluding the protruding surfaces of the anchor bolt machining die fixing support 210 in the lower surface of the support portion 250, may face a lower surface 140 of the first body portion 130.

In addition, according to an embodiment of the present invention, the support portion 250 of the die holder 200 may include a first hollow portion C100. When the anchor bolt machining die 100 and the die holder 200 are coupled to each other in a state where the support portion 250 faces the lower surface 140 of the first body portion 130 to machine the anchor bolt, the first hollow portion C100 may transfer a lubricant or the like, introduced to the second body portions 230 and 240 to the screw machining die 150 and temporarily store dust or the like, that may occur due to the lubricant and the thread machining.

According to an embodiment of the present invention, the second body portions 230 and 240 may include a column portion 230 and a column support portion 240 to enhance ease of machining and stability of the second body portions 230 and 240. The column portion 230 may include a second hollow portion C200 to allow continuous injection of a lubricant when the anchor bolt is machine by the screw machining die 150.

In addition, according to an embodiment of the present invention, the column support portion 240 may include a third hollow portion C300 for transferring the lubricant or the like supplied to the column portion 230 to the support portion 250.

According to an embodiment of the present invention, an outer diameter of the column portion 230 may be smaller than an outer diameter of the column support portion 240 and an inner diameter of the second hollow portion C200 may be equal to or smaller than an inner diameter of the third hollow portion C300.

According to an embodiment of the present invention, the column portion 230 may include an injection hole H30 penetrating through the outer circumferential surface and the inner circumferential surface of the column portion 230. The injection hole H30 may be a hole for injecting a lubricant injected to improve machinability of the anchor bolt when the anchor bolt is machined.

In addition, according to an embodiment of the present invention, one to five, one to three, or one or two injection holes H30 may be formed as necessary. As described above, when the column portion 230 includes the injection hole H30, it is possible to continuously supply a lubricant or the like when the anchor bolt is machined, thereby improving workability of the anchor bolt.

According to an embodiment of the present invention, the column support portion 240 may include a vent hole H40 penetrating through an outer circumferential surface and an inner circumferential surface of the column support portion 240. The vent hole H40 may be a hole for efficiently discharging heat generated in the anchor bolt machining apparatus 10 due to machining when the anchor bolt is machined.

In addition, according to an embodiment of the present invention, a field tank fixed to the foundation surface by the anchor bolt may include a connection portion of the tank where the field tank and the anchor bolt are connected to each other on an outer surface thereof. The connection portion of the tank may protrude to the outer surface of the field tank. In addition, the connection portion of the tank may include an upper portion for coupling with the anchor bolt and a side portion for supporting the upper portion.

In this regard, according to an embodiment of the present invention, an outer diameter of the anchor bolt machining apparatus 10, that is, an outer diameter of a component having the largest outer diameter in the anchor bolt machining apparatus 10 may be smaller than a width between side portions of the connection portion of the tank or a width between the tank and the anchor bolt. As a specific example, the outer diameter of the first body portion 130 and the outer diameter of the support portion 250 may be smaller than the width between the side portions of the connection portion of the tank or the width between the tank and the anchor bolt. If the outer diameter of the first body portion 130 and the outer diameter of the support portion 250 is larger than the width of the connection portion of the tank, it may not be easy to couple the anchor bolt machining apparatus 10 to the anchor bolt partially protruding from the foundation surface.

In addition, according to an embodiment of the present invention, a length of the anchor bolt machining apparatus 10, that is, a length when the anchor bolt machining die 100 and the die holder 200 are coupled to each other, may be smaller than a height between the foundation surface and an upper portion of the connection portion of the tank. If the length of the anchor bolt machining apparatus 10 is longer than the height of the connection portion of the tank, it may not be easy to couple the anchor bolt machining apparatus 10 to the anchor bolt partially protruding from the foundation surface.

Further, the present invention provides an anchor bolt repairing method using the anchor bolt machining apparatus 10.

The anchor bolt repairing method may include: cutting a corroded portion of an anchor bolt; introducing the screw machining die 150 into the first body portion 130 of the anchor bolt machining die 100; inserting an end portion of the anchor bolt, from which the corroded portion was cut away, into the first head portion 120 of the anchor bolt machining die 100 of the anchor bolt machining apparatus 10; coupling the anchor bolt machining die 100 and the die holder 200; injecting a lubricant into the die holder 200; coupling the rotational force supply device 500 to the second head portion 220 of the die holder 200; and supplying a rotational force to the rotational force supply device 500 to machine the anchor bolt.

As a specific example, cutting of the corroded portion of the anchor bolt may be performed by cutting the corroded portion of the bottom of the anchor bolt protruding from the foundation surface. In the method of cutting the corroded portion of the anchor bolt, the corroded portion of the anchor bolt may be cut by a generally available cutting method, such as sawing, a cutting machine, or the like.

Figure 10:
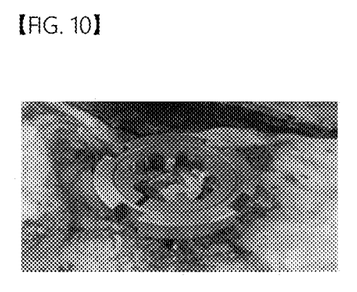
FIG. 10 is a photograph of an anchor bolt machined by an anchor bolt machining apparatus according to an exemplary embodiment and an anchor bolt machining die.
Figure 11:
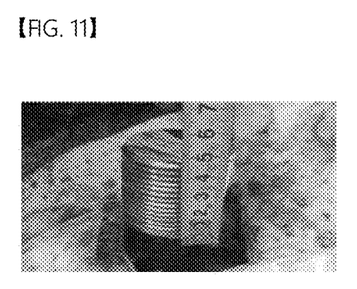
FIG. 11 is a photograph of an anchor bolt machined by an anchor bolt machining apparatus according to an exemplary embodiment.
Figure 12:
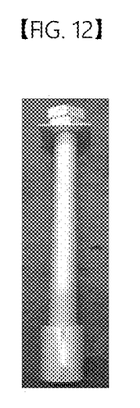
FIG. 12 is a photograph of an anchor bolt coupler according to an exemplary embodiment.

According to an embodiment of the present invention, after the anchor bolt machining apparatus 10 is installed at the anchor bolt according to the anchor bolt repair method, when the rotational force is supplied to the rotational force supply device 500 coupled to the second head portion 220 of the die holder 200, a thread may be formed at the end portion of the anchor bolt by the screw machining die 150 in contact with the end portion of the anchor bolt, as illustrated in FIGS. 10 and 11.

Figure 13:
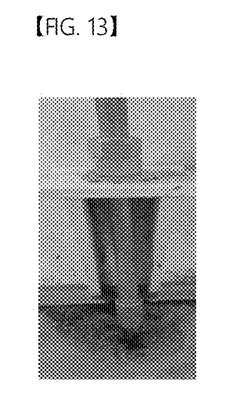
FIG. 13 is a photograph of an anchor bolt, which has been completely repaired using an anchor bolt machining apparatus according to an exemplary embodiment, installed in a surface.
Figure 14:
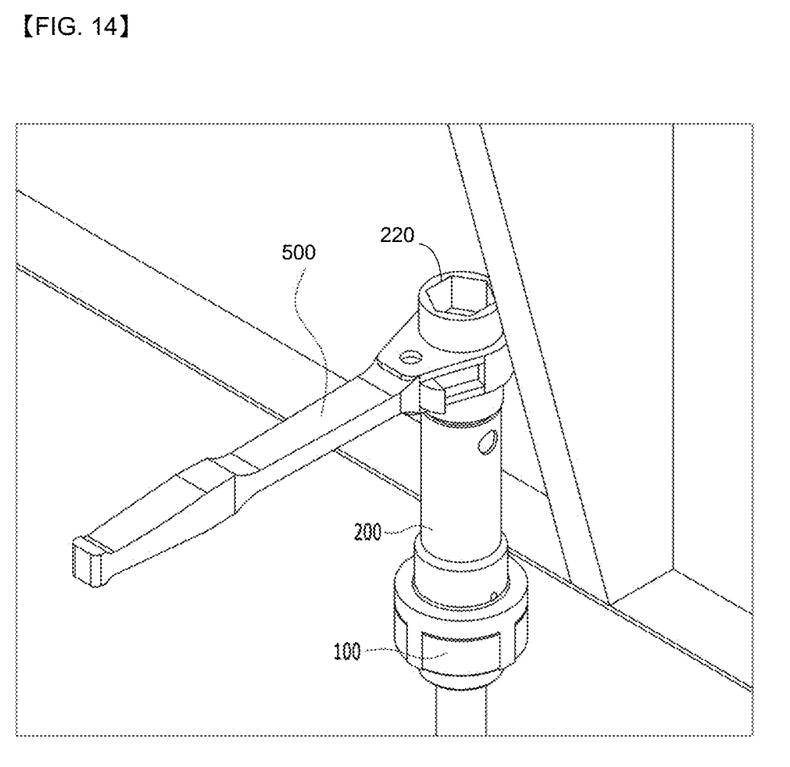
FIG. 14 is a line-drawing of the photogrpah of FIG. 9, showing an anchor bolt machining apparatus according to an exemplary embodiment coupled to a machine an anchor bolt.

Subsequently, in an embodiment of the present invention, when an anchor bolt coupler illustrated in FIG. with a female thread is coupled to the anchor bolt illustrated in FIG. 13 with a thread according to the anchor bolt repairing method, the anchor bolt may be directly repaired in a narrow space, while preventing a degradation of stability of a facility and a safety problem such as a fire during replacement of the anchor bolt.

The invention claimed is:

1. An anchor bolt machining apparatus comprising:
   an anchor bolt machining die; and
   a die holder,
   wherein the anchor bolt machining die includes a first head portion for fixing an anchor bolt and a first body portion receiving a screw machining die,
   wherein the die holder includes a second head portion coupled to a rotational force supply device, a support portion coupled to the anchor bolt machining die, and a second body portion connecting the second head portion and the support portion to each other,
   wherein the first head portion includes a drain hole, and
   wherein a portion of an upper surface of the screw machining die faces the drain hole.

2. The anchor bolt machining apparatus of claim 1, wherein the first body portion comprises a die holder fixing groove provided on an outer circumferential surface of the first body portion, and
   wherein the anchor bolt machining apparatus is coupled by coupling the die holder fixing groove with an anchor bolt machining die fixing support protruding in a direction of a lower surface of the support portion of the die holder.

3. The anchor bolt machining apparatus of claim 1, wherein the first head portion includes a first center hole allowing the anchor bolt to be inserted therethrough, and a second center hole for receiving the screw machining die.

4. The anchor bolt machining apparatus of claim 3, wherein an outer circumferential surface of the screw machining die faces an inner circumferential surface of the second center hole.

5. The anchor bolt machining apparatus of claim 1, wherein the screw machining die includes a M30 to M40 standard thread in millimeters on an inner surface thereof.

6. The anchor bolt machining apparatus of claim 1, wherein the first body portion includes a fixing hole penetrating through an outer circumferential surface and an inner circumferential surface thereof.

7. The anchor bolt machining apparatus of claim 1, wherein a lower surface of the support portion faces a lower surface of the first body portion.

8. The anchor bolt machining apparatus of claim 1, wherein the second portion includes a first hollow portion.

9. The anchor bolt machining apparatus of claim 1, wherein the second body portion includes a column portion and a column support portion, and wherein the column portion includes a second hollow portion and a third hollow portion.

10. The anchor bolt machining apparatus of claim 9, wherein the column portion further includes an injection hole penetrating through an outer circumferential surface and an inner circumferential surface thereof.

11. The anchor bolt machining apparatus of claim 9, wherein the column support portion includes a vent hole penetrating through an outer circumferential surface and an inner circumferential surface thereof.

12. An anchor bolt repairing method, the method comprising:
   cutting a corroded portion of an anchor bolt;
   introducing a screw machining die into a first body portion of an anchor bolt machining die;
   inserting an end portion of the anchor bolt, from which the corroded portion was cut away, into a first head portion of the anchor bolt machining die of an anchor bolt machining apparatus;
   coupling the anchor bolt machining die and a die holder;
   injecting a lubricant into the die holder;
   coupling a rotational force supply device to a second head portion of the die holder; and
   supplying rotational force to the rotational force supply device to machine the anchor bolt.

13. An anchor bolt repairing method, the method comprising:
   cutting a corroded portion of an anchor bolt;
   providing an anchor bolt machining apparatus, wherein the anchor bolt machining apparatus comprises:
      an anchor bolt machining die; and
      a die holder,
      wherein the anchor bolt machining die includes a first head portion for fixing an anchor bolt and a first body portion receiving a screw machining die, and
      wherein the die holder includes a second head portion coupled to a rotational force supply device, a support portion coupled to the anchor bolt machining die, and a second body portion connecting the second head portion and the support portion to each other;
   introducing the screw machining die into the first body portion of the anchor bolt machining die;
   inserting an end portion of the anchor bolt, from which the corroded portion has been cut away, into the first head portion;
   coupling the anchor bolt machining die and the die holder;
   injecting a lubricant into the die holder;
   coupling a rotational force supply device to the second head portion of the die holder; and
   supplying rotational force to the rotational force supply device to machine the anchor bolt.

* * * * *